US008225081B2

(12) United States Patent
Alderegui a et al.

(10) Patent No.: US 8,225,081 B2
(45) Date of Patent: Jul. 17, 2012

(54) UPDATING PROGRAMMABLE LOGIC DEVICES

(75) Inventors: Alfredo Aldereguia, Cary, NC (US); Grace A. Richter, Chapel Hill, NC (US); William B. Schwartz, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 12/486,132

(22) Filed: Jun. 17, 2009

(65) Prior Publication Data

US 2010/0325404 A1 Dec. 23, 2010

(51) Int. Cl.
*G06F 15/177* (2006.01)

(52) U.S. Cl. ................................ 713/2; 713/1; 713/100

(58) Field of Classification Search .................. 713/1, 2, 713/100

See application file for complete search history.

(56) References Cited

U.S. PATENT DOCUMENTS 6,332,137 B1 12/2001 Hori et al.
6,892,256 B1 5/2005 Krishnankutty
6,934,853 B2 8/2005 Christopherson et al.
7,146,541 B2 * 12/2006 Blumberg et al. ......... 714/38.14
7,155,711 B2 12/2006 Vogel et al.
7,194,321 B2 3/2007 Sun et al.
7,340,693 B2 3/2008 Martin et al.
2002/0112091 A1 8/2002 Schott et al.
2007/0043804 A1 2/2007 Fibaek
2007/0276802 A1 11/2007 Piedmonte

* cited by examiner

*Primary Examiner* — Nitin Patel

(74) *Attorney, Agent, or Firm* — Brandon C. Kennedy; Thomas E. Tyson; Biggers & Ohanian, LLP

(57) ABSTRACT

Updating programmable logic devices ('PLDs') in a symmetric multiprocessing ('SMP') computer, each compute node of the SMP computer including a PLD coupled for data communications through a bus adapter, the bus adapter adapted for data communications through a set of one or more input/output ('I/O') memory addresses, including configuring the primary compute node with an update of the configuration instructions for the PLDs; assigning, by the PLDs at boot time in an SMP boot, a unique, separate set of one or more I/O addresses to each bus adapter on each compute node; and providing, by the primary compute node during the SMP boot, the update to all compute nodes, writing the update as a data transfer to each of the PLDs through each bus adapter at the unique, separate set of one or more I/O addresses for each bus adapter.

15 Claims, 5 Drawing Sheets

UPDATING PROGRAMMABLE LOGIC DEVICES

BACKGROUND OF THE INVENTION

1. Field of the Invention

The field of the invention is data processing, or, more specifically, methods, apparatus, and products for updating programmable logic devices ('PLDs').

2. Description Of Related Art

Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas that has seen considerable advancement is the use of programmable logic devices or 'PLDs.' PLDs are used for glue logic, power control, translation of interfaces such as I2C to SPI, debugging interfaces, isolation of failed boards, a variety of boot functions and power-on-self-test or 'POST' and for many other system-level computer operation functions known to those of skill in the art. The exact use of any particular PLD changes from one computer design to another—as well as within any particular computer design from time to time. This is a particular strength of PLDs—that system designers can change their functions even within the same system over time as needs evolve or designs improve.

Such changes in function, updates to PLD configuration instructions, however, are laborious to carry out in single computer systems, and in multi-node computers, such as symmetric multiprocessing systems, for example, such updates are extremely laborious. Such updates in prior art systems may include, for example, requirements to:

- connect a separate floppy drive to each compute node
- insert a separate bootable PLD update disk into each floppy drive on each compute node
- boot all compute nodes
- hurriedly press ESC on a keyboard of each compute node to effect a boot in stand-alone mode—as opposed to SMP mode—noting that if the user misses an ESC press, the user has to start over with the boot because the system will proceed to attempt an SMP boot
- update the PLD configuration instructions on each compute node
- power cycle each compute node separately, cutting all power, not just a warm boot
- reboot all compute nodes in SMP mode through service processors.

SUMMARY OF THE INVENTION

Methods, apparatus, and computer program products are described for updating programmable logic device ('PLDs') in a symmetric multiprocessing ('SMP') computer, each PLD configured according to configuration instructions installed within each PLD, the SMP computer comprising a plurality of compute nodes including a primary compute node and one or more secondary compute notes, the compute nodes sharing a same memory address space, each compute node further comprising a PLD coupled for data communications to at least one computer processor through a bus adapter, the bus adapter adapted for data communications through a set of one or more input/output ('I/O') memory addresses, each bus adapter defaulting, upon a stand-alone boot, to a same set of one or more I/O memory addresses, including configuring the primary compute node with an update of the configuration instructions for the PLDs; assigning, by the PLDs at boot time in an SMP boot, a unique, separate set of one or more I/O addresses to each bus adapter on each compute node; and providing, by the primary compute node during the SMP boot, the update to all compute nodes, writing the update as a data transfer to each of the PLDs through each bus adapter at the unique, separate set of one or more I/O addresses for each bus adapter.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
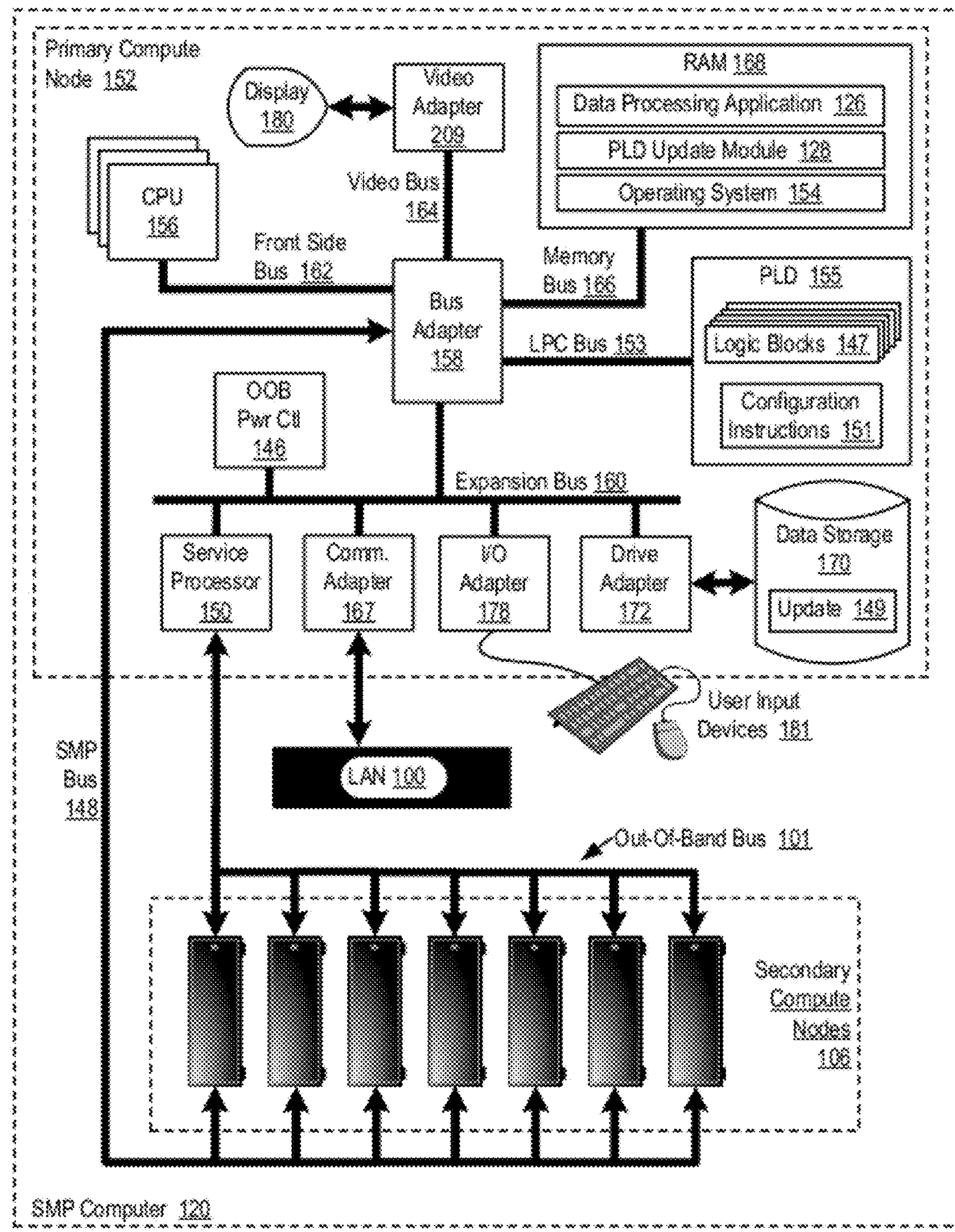
FIG. 1 sets forth a network diagram of a symmetric multiprocessing ('SMP') computer that updates PLDs according to embodiments of the present invention.

Exemplary methods, apparatus, and products for updating PLDs in accordance with the present invention are described with reference to the accompanying drawings, beginning with FIG. 1. FIG. 1 sets forth a network diagram of a symmetric multiprocessing ('SMP') computer (120) that updates PLDs according to embodiments of the present invention. The SMP computer of FIG. 1 includes eight compute nodes (152, 106), each of which is a separate computer in itself, coupled into SMP mode by an SMP expansion bus (148), and sharing the same overall memory address space. The compute nodes in this example include a primary compute node (152) and seven secondary compute nodes (106). In terms of overall structure, all of the compute nodes are effectively identical, each including one or more CPUs (156), at least one bus adapter (158), a service processor (150), a PLD (155), computer memory (168, 170), I/O adapters (209, 178), communications adapters (167), and so on. In fact, in many SMP computers that carry out PLD updates according to embodiments of the present invention, all of the compute nodes in the SMP computer would be of the same model, such as IBM xSeries 460 servers, for example. For convenience of illustration, therefore, because their structures are the same, only one of the compute nodes, the primary compute node (152), is shown in more detail. The primary compute node (152) is designated 'primary' because, by comparison with the operation of the secondary compute nodes, the primary compute node is assigned some additional responsibilities for triggering and monitoring the processes for updating PLDs according to embodiments of the present invention, as explained in more detail below. The description in this specification, however, of the structure of the primary computer node (152) is also generally a description of the structures of the secondary compute nodes (106).

The compute nodes (152, 106) of FIG. 1 include at least one computer processor implemented as a central processing unit or 'CPU' (156) as well as random access memory ('RAM') (168) which is connected through a high speed memory bus (166) and bus adapter (158) to CPU (156) and to other components of the compute node. Stored in RAM (168) is a data processing application (126), a module of automated computing machinery, computer program instructions implemented a configuration of computer memory, electronics circuitry, for carrying out a particular type of user-level data processing, such as, for example, a Web server or browser, an email server or client, accounting, database management, word processing, electronic spreadsheets, and so on. Also stored RAM (168) is a PLD update module (128), a module of automated computing machinery configured to carry out PLD updates according to embodiments of the present invention. Also stored in RAM (168) is an operating system (154). Operating systems useful for updating PLDs according to embodiments of the present invention include UNIX™, Linux™, Microsoft XP™, AIX™, IBM's i5/OS™, and others as will occur to those of skill in the art. The operating system (154), the data processing application (126), and the PLD update module (128) in the example of FIG. 1 are shown in RAM (168), but many components of such software typically are stored in non-volatile memory also, such as, for example, on a disk drive (170).

In the example of FIG. 1, each compute node (152, 106) also includes a PLD (155) coupled for data communications to a CPU (156) through a bus adapter (158). Each PLD is an electronic component that implements reconfigurable digital circuits.

Unlike a logic gate, or even a large network of sequential or non-sequential logic gates, which has a fixed function, a PLD has an undefined function at the time of manufacture. Before the PLD can be used in a circuit it must be programmed, that is, reconfigured. In this example, each PLD (155) includes a number of logic blocks (147) that is configured to carry out logic functions according to configuration instructions (151) installed within each PLD. The configuration instructions typically are implemented in a hardware description language ('HDL') such as Verilog or the Very high speed integrated circuits Hardware Description Language or 'VHDL.'

Examples of PLDs amenable to updating according to embodiments of the present invention include a complex programmable logic device ('CPLD'), a field programmable gate array ('FPGA'), and a programmable system-on-chip ('PSOC'). The logic blocks of a CPLD are typically so-called 'macro cells,' logic blocks that contain logic implementing disjunctive normal form expressions and more specialized logic operations. FPGAs are typically more complex and powerful that CPLDs. The logic blocks in FPGAs implement a hierarchy of reconfigurable interconnects that allow the blocks to be, in effect, wired together somewhat like a one-chip programmable breadboard. Logic blocks in FPGAs can be configured to perform complex combinational functions, or merely simple logic gates like AND and XOR. In most FPGAs, the logic blocks also include memory elements, which may be simple flip-flops or more complete blocks of memory. A PSOC is one of a family of mixed-signal arrays made by Cypress Semiconductor, featuring a microcontroller and configurable integrated analog and digital peripherals. A PSOC includes a processing core implemented with an 8-bit Harvard architecture design called the M8C. PSOC logic blocks can be assigned a wide range of functions and interconnected on-chip. PSOC resembles FPGAs and CPLDs in that at power up it must be configured by loading instructions from non-volatile memory. Such PLDs typically provide on-chip or chipset non-volatile storage for their configuration instructions (151) in, for example, EEPROM or Flash memory, making such PLDs a good choice in modern digital designs to perform boot time functions before handing over control to other devices not having this capability. A CPLD may even be used to load configuration data for a more complex FPGA from other external non-volatile memory, for example. This non-volatility is used in SMP computers that update PLDs according to embodiments of the present invention by using such PLDs to assign a unique, separate set of one or more I/O addresses to each bus adapter on each compute node of the SMP computer, a function that would be much more difficult without non-volatile storage of a PLD's configuration instructions (151) so that they are presently available at boot time.

In the example of FIG. 1, the primary compute node (152) is configured with an HDL update of the configuration instructions for the PLDs by storing such an update (149) in non-volatile computer memory in the primary compute node, on disk (170), for example. Then the update of the PLDs is carried out by providing, from the primary compute node during an SMP boot, the update (149) to all compute nodes, including the primary compute node, writing the update as a data transfer to each of the PLDs through each bus adapter at a unique, separate set of one or more I/O addresses for each bus adapter. Note that the update is provided from the primary compute node to all compute nodes, including the primary, the primary providing the update to itself, so that all compute nodes are updated in the same manner in unison, including updating the primary compute node in the same fashion as the secondary compute nodes.

The bus adapter (158) is a chip or chipset that adapts data communications among multiple buses, in this example, among a high speed front side bus (162), a high speed video bus (164), a high speed memory bus (166), a lower speed low pin count ('LPC') bus (153), and a lower speed expansion bus (160). The bus adapter as a chipset could be implemented as the well known Northbridge/Southbridge with the Northbridge handling the higher speed buses and the Southbridge handling the lower speed buses. The components of such chipsets are also known as a memory controller hub ('MCH'), an integrated memory controller ('IMC'), an I/O controller hub ('ICH'), or a platform controller hub ('PCH'). There is somewhat of a trend to bundle all this functionality into a single chip, however, and so the bus adapter (158) in this example, for convenience of explanation, is described as a single device. Such bus adapters (158) each may host its own memory cache, memory lookup table, and I/O memory management unit ('MMU'), mapping the memory address space layout in main memory as well as the I/O memory addresses. Alternatively, the MMU, memory table, and memory cache may be hosted on the CPU chip itself—or in one or more separate chips or chipsets.

The bus adapters in the compute nodes here are adapted for data communications through a set of one or more input/output ('I/O') memory addresses, with each bus adapter defaulting, upon a stand-alone boot, to a same set of one or more I/O memory addresses. The term 'stand-alone boot' refers to a boot mode without SMP functionality. In SMP mode, because all the compute nodes sharing the same address space, if all the bus adapters share the same I/O addresses, I/O functionality becomes ambiguous, and any I/O directed from a CPU on any compute node to an address of a bus adapter will be taken as I/O only to the bus adapter on that particular compute node. An I/O instruction directed to such an address from the CPU (156) on the primary compute node (152), for example, will be received by the bus adapter (158) on the front side bus (162), and always interpreted as directed to that receiving bus adapter (158) on the primary compute node (152), with no way to direct such I/O, therefore, from the primary compute node (158) to any bus adapter on any other compute node. To address this problem, updating PLDs according to embodiments of the present invention includes assigning, by the PLDs (155) at boot time in an SMP boot, a unique, separate set of one or more I/O addresses to each bus adapter on each compute node. In this way, the primary compute node can provide an update to all secondary compute nodes during an SMP boot, writing the update as a data transfer to each of the PLDs through each bus adapter at the unique, separate set of one or more I/O addresses for each bus adapter.

The compute nodes (152, 106) of FIG. 1 each includes a disk drive adapter (172) coupled through expansion bus (160) and bus adapter (158) to processor (156) and other components of the compute node. Disk drive adapter (172) connects non-volatile data storage to the compute node in the form of disk drive (170). Disk drive adapters useful in computers for updating PLDs according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example compute nodes (152, 106) of FIG. 1 each includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example compute nodes of FIG. 1 each includes a video adapter (209), an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example compute nodes (152, 106) of FIG. 1 each include a communications adapter (167) for data communications with other computers and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that update PLDs according to embodiments of the present invention include modems for wired dial-up communications, Ethernet (IEEE 802.3) adapters for wired data communications network communications, and 802.11 adapters for wireless data communications network communications.

Each compute node (152, 106) also includes a service processor (150) which communicates with other service processors on the other compute nodes through out-of-band bus (101). The out-of-band bus (101) may be, for example, an Inter-Integrated Circuit ('I2C') bus, a system management bus ('SMB'), a JTAG bus, or the like. The term 'service processor' here refers to both hardware and software functionality for low-level control of a computer as a system, including such services as:

- environmental monitoring and automated shutdown in the event of an out-of-bounds condition, such as a CPU getting too hot
- dynamic reconfiguration in which CPU, memory, and/or Input-Output boards are added to or removed from a running computer
- assigning multiple paths to Input-Output devices for increased availability
- monitoring and displaying platform environmental statistics, such as the temperatures, currents, and voltages present on system boards
- monitoring and controlling power flow to the platform components such as system boards and control boards
- Power On Self Test and similar platform diagnostics
- logging and notification of various system events
- other system-level functions as may occur to those of skill in the art.

In updating PLDs according to embodiments of the present invention, many functions are implemented in-band, through the SMP functionality, and some functions may be implemented out-of-band through use of the service processors. One example of a function implemented out-of-band is cycling power as may be needed in some embodiments to reconfigure PLDs according to updated configuration instructions. The compute nodes in the example of FIG. 1 each includes an out-of-band power control circuit (146) that is configured to control power to each compute node so that upon powering off for reconfiguration, even any standby power that might otherwise continue to be applied to the PLDs is removed for some predetermined period of time. Compute nodes will typically include sophisticated power management systems with multiple designated power levels, full power, standby power, all power removed except clock batteries, and so on. In such systems, it is common for chips with volatile configurations such as PLDs to remain powered when the overall power mode is on standby. The out-of-band power control circuit (146) is therefore implemented 'out-of-band' in the sense that it operates outside of the usual power control system to override the usual power control system as needed for PLD reconfiguration. The out-of-band power control circuit is explained in more detail below with reference to FIG. 5.

The arrangement of compute nodes and other devices making up the exemplary system illustrated in FIG. 1 are for explanation, not for limitation. In particular, there is nothing limiting about the use of eight compute nodes for the example of FIG. 1; SMP computers that update PLDs according to embodiments can implement any number of compute nodes as will occur to those of skill in the art. Data processing systems useful for updating PLDs according to various embodiments of the present invention may include additional computers, servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those examples illustrated in FIG. 1.

Figure 2:
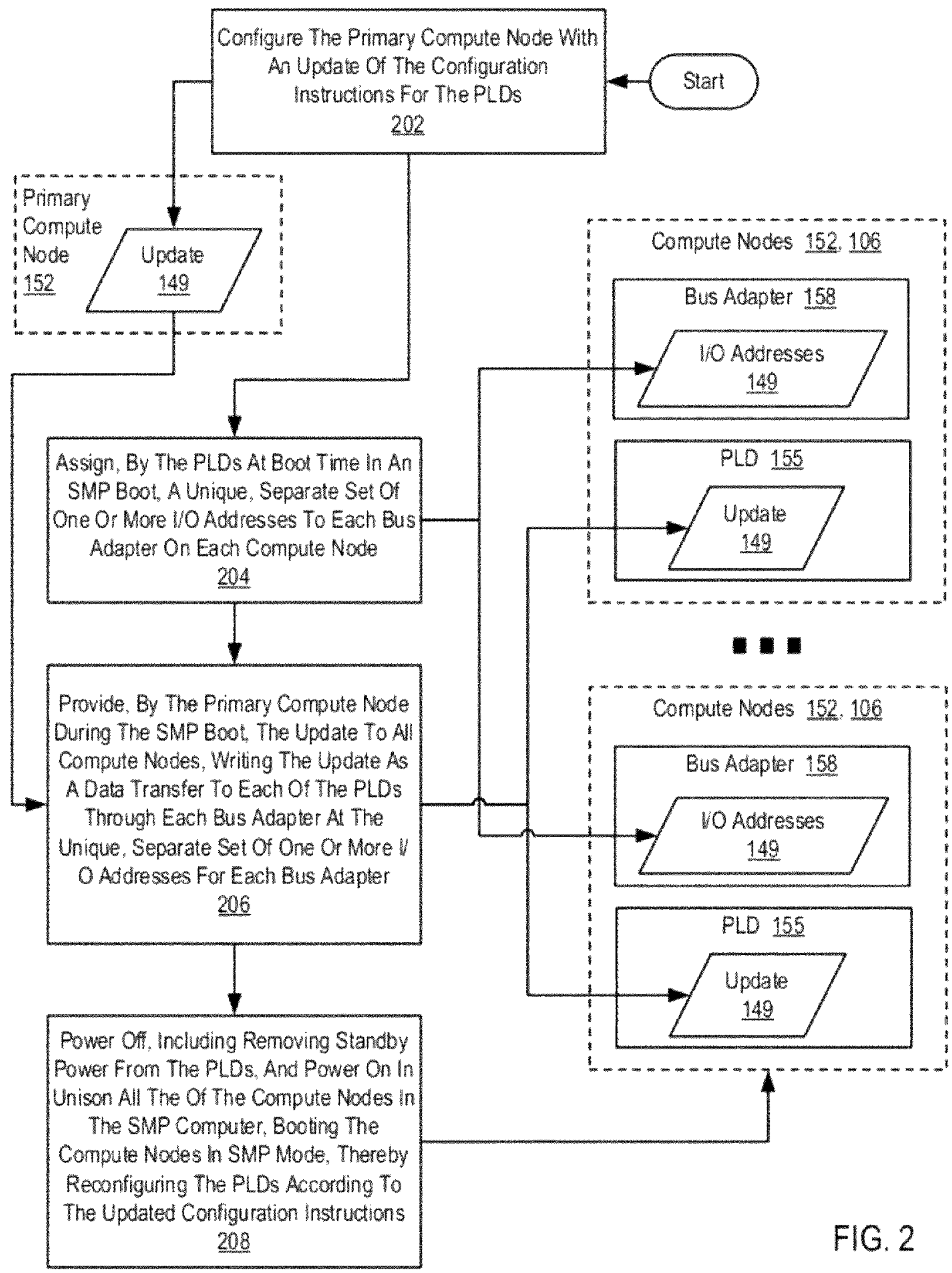
FIG. 2 sets forth a flow chart illustrating an example method of updating PLDs according to embodiments of the present invention.

For further explanation, FIG. 2 sets forth a flow chart illustrating an example method of updating PLDs according to embodiments of the present invention. The method of FIG. 2 is implemented in an SMP computer (120) like the one described above with reference to FIG. 1, and the method of FIG. 2 is therefore described with reference both to FIG. 2 and also with reference to FIG. 1. The SMP computer includes a number of compute nodes including a primary compute node (152) and one or more secondary compute notes (106), where the compute nodes share the same memory address space. Each compute node includes a PLD (155) coupled for data communications to at least one computer processor (156) through a bus adapter (158). The bus adapter is adapted for data communications through a set of I/O memory addresses (149). Each bus adapter (158) defaults upon a stand-alone boot to the same set of I/O memory addresses. In the method of FIG. 2, each PLD is configured according to configuration instructions (151) installed within each PLD (155). Each PLD (155) may be implemented as, for example, a CPLD, an FPGA, or a PSOC.

The method of FIG. 2 includes configuring (202) the primary compute node (152) with an update (149) of the configuration instructions (151) for the PLDs (155). In this example, the primary compute node is so configured by storing the update in the form of HDL instructions in non-volatile memory on a disk drive (170), making the update available at boot time.

The method of FIG. 2 also includes assigning (204), by the PLDs at boot time in an SMP boot, a unique, separate set of one or more I/O addresses to each bus adapter on each compute node. Assigning (204) a unique, separate set of one or more I/O addresses to each bus adapter on each compute node may be carried out by, for example, remapping a predetermined alternate IO address range as the I/O address range of each bus adapter on each compute node. A token is defined to determine which I/O address range is being updated. A new bit is defined in for use in each bus adapter to represent the tokens across bus adapters.

In typical prior art systems, the I/O address range which accessed a PLD through a bus adapter would be disabled except on the primary compute node because the compatibility devices reside in a fixed I/O range. Therefore a new fixed I/O range is specified such that, when any particular bus adapter has the token, that bus adapter will respond to the alternate I/O range and pass the update configuration instructions to the PLD SIO attached to that bus adapter. With this method once the update to the PLD has begun in a multi-chassis system the update is completed across all nodes before the PLD in the primary compute node can be accessed again for that address range unless the system is reset. This process is similar to a flash update over a range of I/Os defined along with a token and register set in the bus adapter, where moving the token around moves the I/O range to the correct compute node.

In single node systems, the method used to update the PLD is to write to general purpose I/O addresses ('GPIOs') on the bus adapter. In multi-node systems, however, there are multiple bus adapters all at the same address. The method described here allows the redirection of PLD update configuration instructions to multiple compute nodes in a single system. Because the PLD may not be fully reconfigured until a next power cycle, configuration of multiple addresses for the bus adapters via the PLD would optionally be maintained until after the update is complete.

Typically, the GPIO address is 16 to 32 bits, set in each bus adapter. In some systems, the system management interrupts ('SMIs') are routed to the PLD. The register in the PLD which latches the SMIs has a remappable address inside the PLD, so that when the compute nodes' address spaces are merged for SMP operations, the power-on-self-test or 'POST' can remap the register based on a multi-node merged I/O address space. With this method, when an SMI occurs, the BIOS can determine which node the SMI occurred in. This method allows the mappable SMI register which is implemented within the PLD to be remapped at any time, even after the merge of the overall address space is complete, to any address within a predetermine bit range, say 16 bit range, for example, as long as the address does not create a conflict and as long as BIOS has access to the LPC bus.

The method of FIG. 2 also includes providing (106), by the primary compute node during the SMP boot, the update to all compute nodes. Providing the update to all the compute nodes is carried out by writing the update as a data transfer to each of the PLDs through each bus adapter at the unique, separate set of one or more I/O addresses for each bus adapter. This includes the primary compute nodes writing the update to, not only the secondary compute nodes, but also to the primary compute node itself. The unique, separate I/O addresses for the bus adapter on the primary compute node can remain the default I/O addresses so long as all the unique, separate I/O addresses on the secondary compute nodes are otherwise. Writing the update in this example is carried out in-band, according to instructions of the PLD update module (128) executing on the CPU (156) of the primary compute node (152), written to the bus adapter on the primary compute node through the front side bus (162) and written to the secondary compute nodes through the SMP bus (148).

The method of FIG. 2 also includes powering off (208), including removing standby power from the PLDs, and powering on in unison all the of the compute nodes in the SMP computer, booting the compute nodes in SMP mode, thereby reconfiguring the PLDs according to the updated configuration instructions. The process of powering off and powering on the compute nodes is explained in more detail below with reference to FIGS. 5 and 6.

Figure 3:
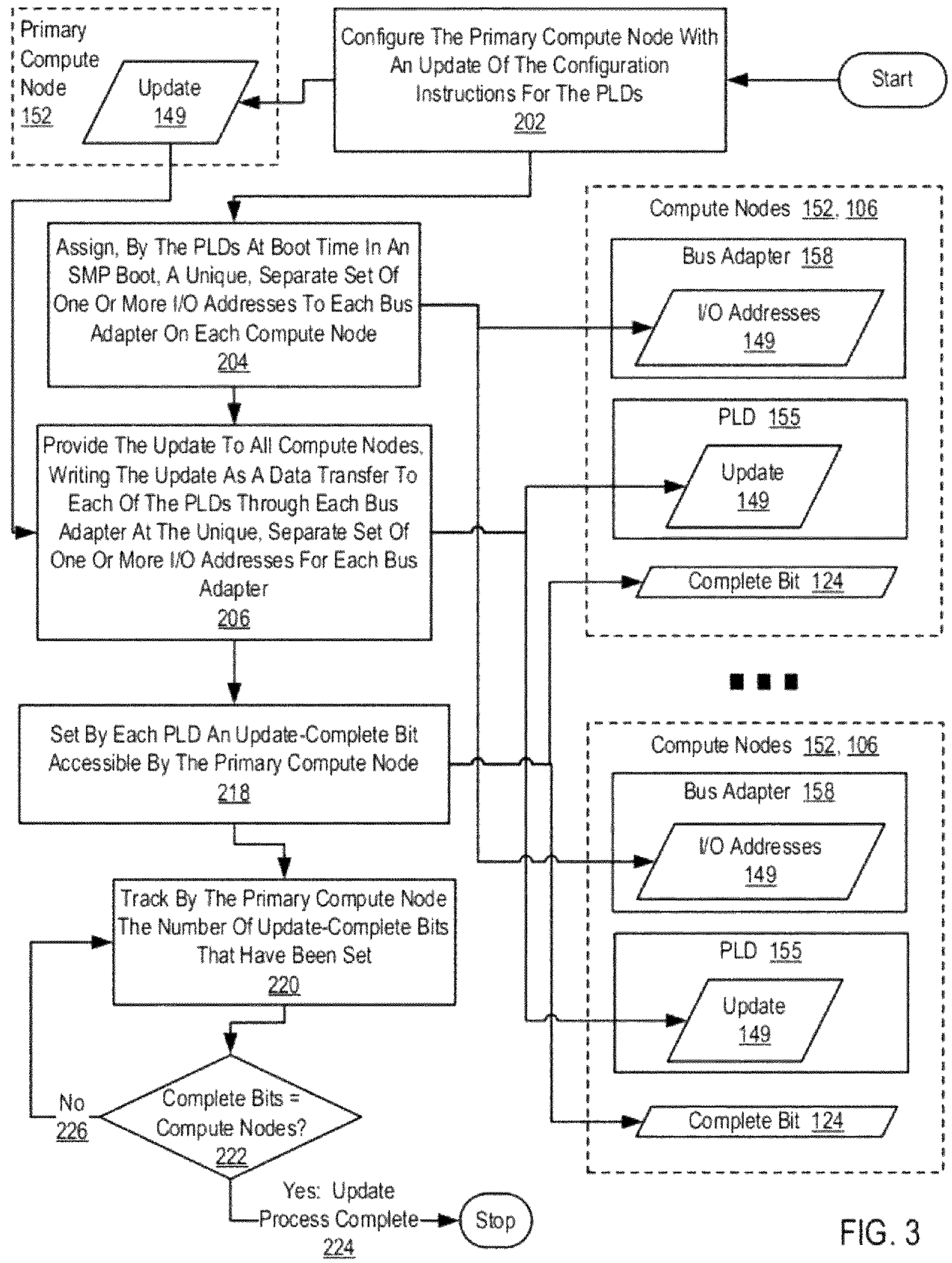
FIG. 3 sets forth a flow chart illustrating a further example method of updating PLDs according to embodiments of the present invention.

For further explanation, FIG. 3 sets forth a flow chart illustrating a further example method of updating PLDs according to embodiments of the present invention. The method of FIG. 3 is similar to the method of FIG. 2, including as it does configuring (202) the primary compute node (152) with an update (149) of the configuration instructions (151) for the PLDs (155), assigning (204) a unique, separate set of one or more I/O addresses to each bus adapter on each compute node, and providing (106) the update to all compute nodes. Also like the method of FIG. 2, the method of FIG. 3 is implemented in an SMP computer (120) like the one described above with reference to FIG. 1, and the method of FIG. 3 is therefore also described with reference both to FIG. 3 and also with reference to FIG. 1. The SMP computer includes compute nodes (152, 106) sharing the same memory address space. Each compute node includes a PLD (155) coupled for data communications to a bus adapter (158) that is adapted for data communications through a set of I/O memory addresses (149) that default upon a stand-alone boot to the same set of I/O memory addresses, with each PLD configured by configuration instructions (151) installed within each PLD (155).

The method of FIG. 3, however, unlike the method of FIG. 2, also includes setting (218) by each PLD (155) an update-complete bit (124) accessible by the primary compute node (152). That is, each PLD, including the PLD on the primary compute node, when it has received the entire update, sets its own update-complete bit. Remember to distinguish configuring (202) the primary compute node with the update and providing (206) the update to PLDs, a process that occurs in the same way on the primary compute node as it does on the secondary compute nodes. The update-complete bits for the secondary compute nodes can be set in memory on the primary computer node with an in-band memory write through the SMP bus (148). Or the update-complete bit can be set in memory on each secondary compute node in a memory location accessible by the primary compute node with an in-band memory read through the SMP bus.

The method of FIG. 3 also includes tracking (220) by the primary compute node the number of update-complete bits (124) that have been set. When the update-complete bits are in the primary compute node, this is just a read to local memory by the PLD update module (128) on the primary compute node (152). When the update-complete bits for the secondary compute nodes are stored in the secondary compute nodes (106), this step includes an in-band memory read through the SMP bus (148) to gather the update-complete bits (125) from the secondary compute nodes (106).

The method of FIG. 3 also includes determining (224) by the primary compute node that the update process is complete when the number of set update-complete bits is equal to the number of compute nodes in the SMP computer. The primary compute nodes makes this determination by periodically comparing (222) the number of update-complete bits that have been set with the number of compute nodes in the SMP computer. While the update process is not yet complete (226), the primary compute node continues tracking (220) the update-complete bits.

Figure 4:
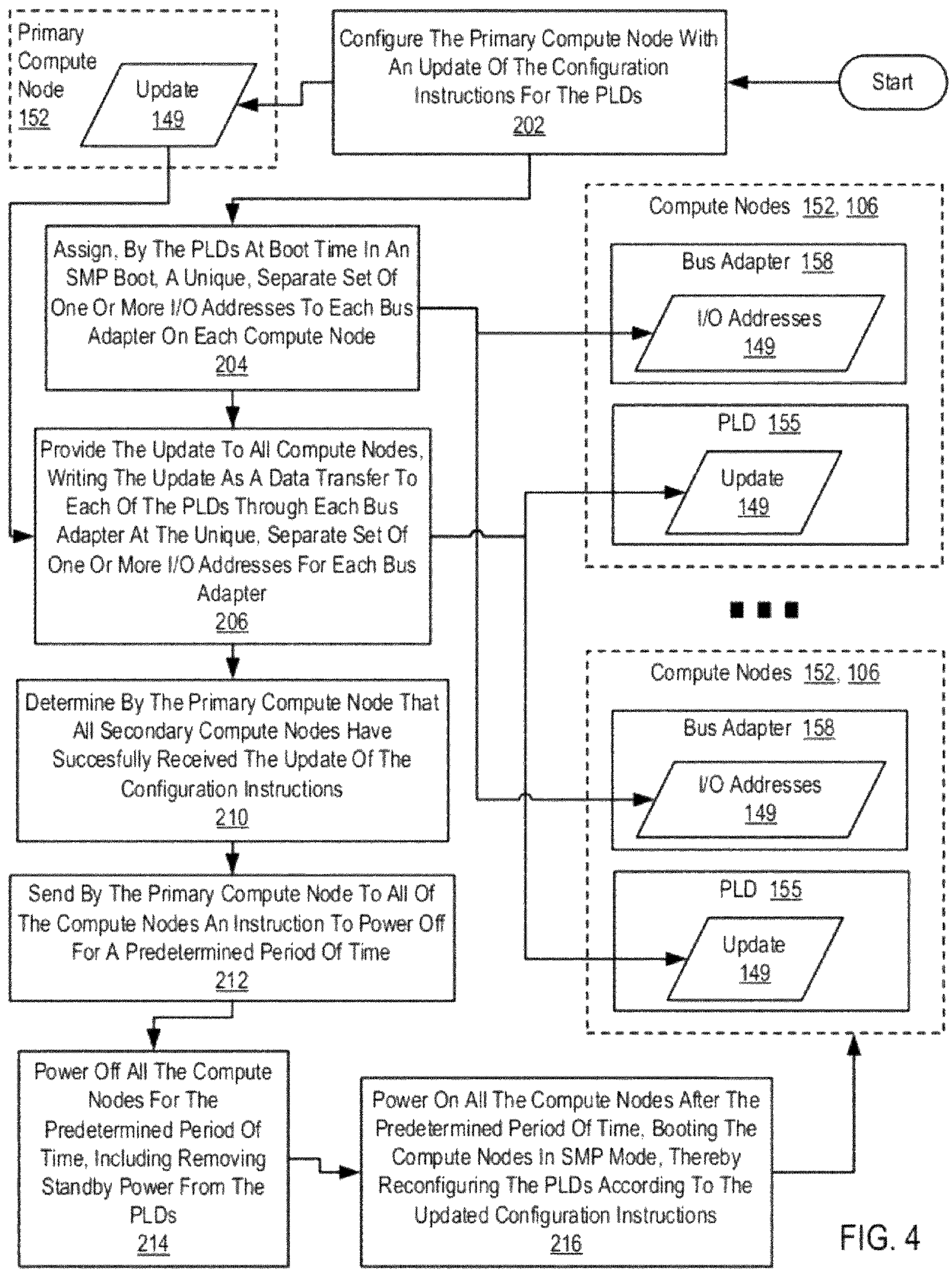
FIG. 4 sets forth a flow chart illustrating a further example method of updating PLDs according to embodiments of the present invention.

For further explanation, FIG. 4 sets forth a flow chart illustrating a further example method of updating PLDs according to embodiments of the present invention. The method of FIG. 4 is similar to the method of FIG. 2, including as it does configuring (202) the primary compute node (152) with an update (149) of the configuration instructions (151) for the PLDs (155), assigning (204) a unique, separate set of one or more I/O addresses to each bus adapter on each compute node, and providing (106) the update to all compute nodes. Also like the method of FIG. 2, the method of FIG. 4 is implemented in an SMP computer (120) like the one described above with reference to FIG. 1, and the method of FIG. 4 is therefore also described with reference both to FIG. 4 and also with reference to FIG. 1. The SMP computer includes compute nodes (152, 106) sharing the same memory address space. Each compute node includes a PLD (155) coupled for data communications to a bus adapter (158) that is adapted for data communications through a set of I/O memory addresses (149) that default upon a stand-alone boot to the same set of I/O memory addresses, with each PLD configured by configuration instructions (151) installed within each PLD (155).

The method of FIG. 4, however, unlike the method of FIG. 2, also includes determining (210) by the primary compute node that all secondary compute nodes have successfully received the update of the configuration instructions and then sending (212) by the primary compute node (152) to all of the compute nodes (152, 106) an instruction to power off for a predetermined period of time. Note that this instruction to power off goes from the primary compute node to all compute nodes including both the secondary compute nodes and the primary compute node as well.

The method of FIG. 4 also includes, responsive to the instruction to power off, powering off (214) by all the compute nodes for the predetermined period of time, including removing standby power from the PLDs for the predetermined period of time. The instruction to power off is an out-of-band instruction to the service processors to operate the out-of-band power control circuit to turn off all power to the compute nodes, including removing standby power from the PLDs. The only power still present is battery power to battery-backed components such as system clocks.

The method of FIG. 4 also includes powering on (216) by all the compute nodes after the predetermined period of time, booting the compute nodes in SMP mode, thereby reconfiguring the PLDs according to the updated configuration instructions. The implementation of power off—and then power on after a predetermined period of time—is explained in more detail below with reference to FIG. 5.

Figure 5:
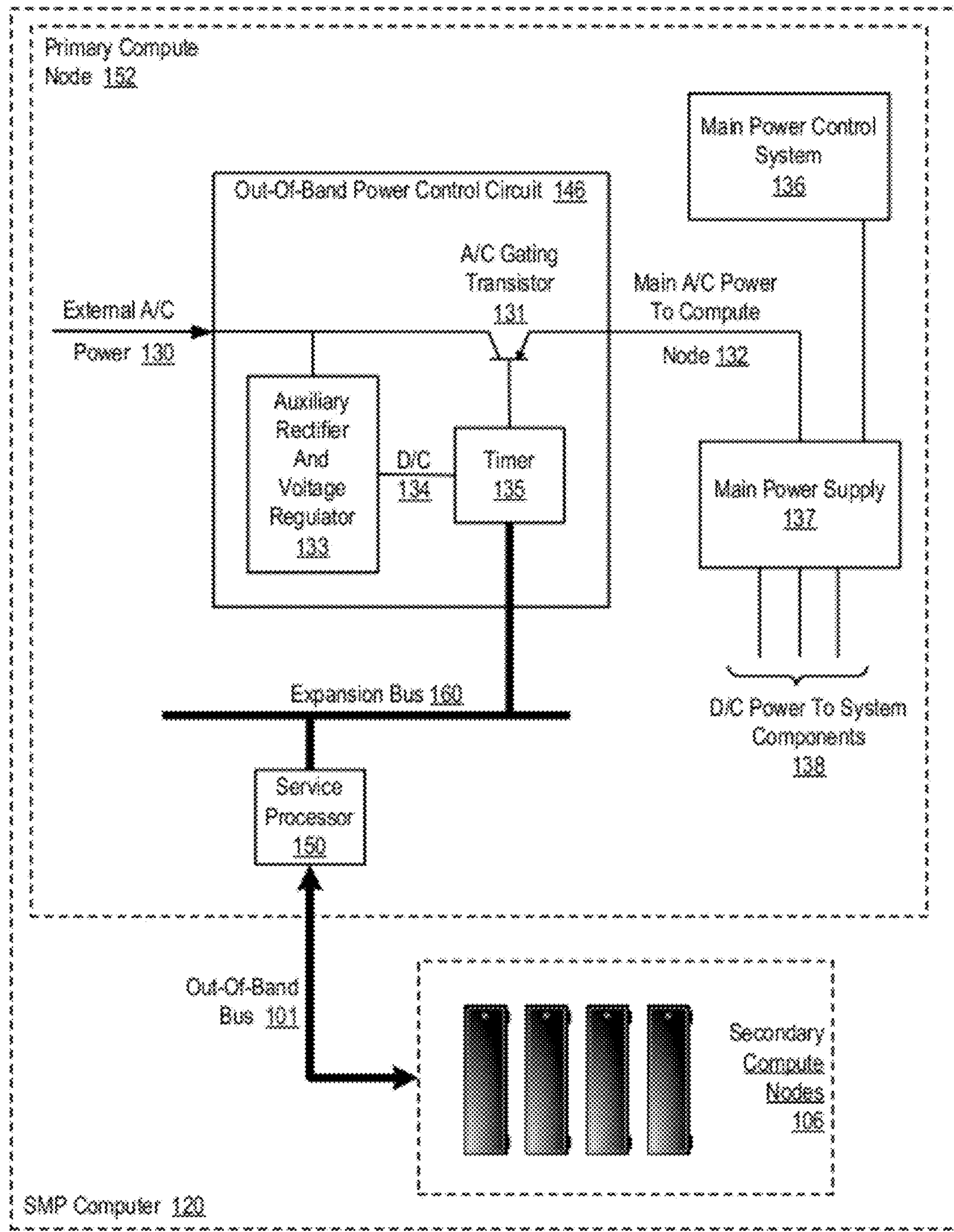
FIG. 5 sets forth a schematic diagram of an example out-of-band power control circuit for updating PLDs according to at least some embodiments of the present invention.

For further explanation, FIG. 5 sets forth a schematic diagram of an example out-of-band power control circuit that is functional for updating PLDs according to at least some embodiments of the present invention. The out-of-band power control circuit (146) of FIG. 5, for convenience of explanation, is depicted as a component of the primary compute node (152), but a similar circuit is present in the secondary compute nodes (106) also. The out-of-band power control circuit (146) of FIG. 5 is coupled for data and instruction communications through expansion bus (160) to a service processor (150) which in turn is coupled for data communications through out-of-band bus (101) to other service processors in the secondary compute nodes (106) of an SMP computer (120) like the one described above with reference to FIG. 1. The out-of-band power control circuit itself (146) is composed of a timer (136) that controls an A/C gating transistor (131) and an auxiliary rectifier and voltage regulator (133). The entire external A/C power supply (130) for each compute node is coupled through the A/C gating transistor (131) to the main power supply (137) of each compute node—which in turn provide D/C power (138) to all components of each compute node. The main power supply (137) in under control of the main power control system (136) in each compute node, and the main power control system (136) provides various power operating modes including, for example, full power, standby power, and a power off mode in which only battery-backed components are still powered. In normal operation of the main power control system, PLDs may be powered during standby mode as well as full power off mode, so that there is no in-band way to reconfigure PLDs that require a power cycle for such reconfiguration.

The operation of out-of-band power control circuit (146), however, can completely remove all power from such PLDs, including standby power that would ordinarily be applied by the main power supply (137) under usual control by the main power control system (136). As long as external A/C power (130) is connected, the auxiliary rectifier and voltage regulator (133) provides power (134) to the timer (135), even when the main A/C power (132) to the compute node is gated off by the A/C gating transistor. When the primary compute node determines that all compute nodes, including the primary compute node, have successfully received the update of the configuration instructions, the primary compute node sends to all the compute nodes, out-of-band through bus (101) and the service processors (150), an instruction to power off for a predetermined period of time. The service processors deliver this instruction to the timers (135) which turn off their A/C gating transistors for the predetermined period of time, say 10 seconds, for example. The timers continue to operate for this power off period because they are powered by their auxiliary voltage regulators (133) which are always connected to their main external A/C power source (130) even when all other power to the compute node is cut off by the A/C gating transistor. This completely cuts off all power to the main power supply (137), which in this mode cannot provide any D/C power (138) to components whatsoever, including standby power to PLDs. Upon expiration of the predetermined period, the timers (135) in each compute node operate their A/C gating transistors (131) to return main A/C power (132) to each compute node, booting the compute nodes in SMP mode, and thereby reconfiguring PLDs (155 on FIG. 1) according to their updated configuration instructions.

In view of the explanations set forth above, readers will recognize that the benefits of updating PLDs according to embodiments of the present invention include:

updating all the PLDs in a multi-node system at one time with no requirement to boot any node stand alone using a minimal number of I/O addresses, only the number of IO addresses needed to assign separate addresses to the bus adapters updating all nodes to the same level with only one bring up by a user, ensuring that updated configuration instructions is in effect on all nodes (mismatched PLD configurations across multiple nodes in a single system can cause unpredictable results)

power cycling upon update completion with no need for user intervention

Example embodiments of the present invention are described in this specification largely in the context of fully functional computer systems that update PLDs. Readers of skill in the art will recognize, however, that the present invention also may be embodied in a computer program product disposed on recordable, computer readable media for use with any suitable data processing system. Such media may be may include, for example, magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of updating programmable logic devices ('PLDs') in a symmetric multiprocessing ('SMP') computer, each PLD configured according to configuration instructions installed within each PLD, the SMP computer comprising a plurality of compute nodes including a primary compute node and one or more secondary compute notes, the compute nodes sharing a same memory address space, each compute node further comprising a PLD coupled for data communications to at least one computer processor through a bus adapter, the bus adapter adapted for data communications through a set of one or more input/output ('I/O') memory addresses, each bus adapter defaulting, upon a stand-alone boot, to a same set of one or more I/O memory addresses, the method comprising:

configuring the primary compute node with an update of the configuration instructions for the PLDs;

assigning, by the PLDs at boot time in an SMP boot, a unique, separate set of one or more I/O addresses to each bus adapter on each compute node; and providing, by the primary compute node during the SMP boot, the update to all compute nodes, writing the update as a data transfer to each of the PLDs through each bus adapter at the unique, separate set of one or more I/O addresses for each bus adapter.

2. The method of claim 1 wherein each PLD comprises only one of:

a complex programmable logic device ('CPLD'), a field programmable gate array ('FPGA'), or a programmable system-on-chip ('PSOC').

3. The method of claim 1 further comprising:

setting by each PLD an update-complete bit accessible by the primary compute node;

tracking by the primary compute node the number of update-complete bits that have been set; and determining by the primary compute node that the update process is complete when the number of set update-complete bits is equal to the number of compute nodes in the SMP computer.

4. The method of claim 1 further comprising powering off, including removing standby power from the PLDs, and powering on in unison all the of the compute nodes in the SMP computer, booting the compute nodes in SMP mode, thereby reconfiguring the PLDs according to the updated configuration instructions.

5. The method of claim 1 further comprising:

determining by the primary compute node that all compute nodes have successfully received the update of the configuration instructions;

sending by the primary compute node to all of the compute nodes an instruction to power off for a predetermined period of time;

responsive to the instruction to power off, powering off by all the compute nodes for the predetermined period of time, including removing standby power from the PLDs for the predetermined period of time; and powering on by all the compute nodes after the predetermined period of time, booting the compute nodes in SMP mode, thereby reconfiguring the PLDs according to the updated configuration instructions.

6. Apparatus for updating programmable logic devices ('PLDs') in a symmetric multiprocessing ('SMP') computer, each PLD configured according to configuration instructions installed within each PLD, the SMP computer comprising a plurality of compute nodes including a primary compute node and one or more secondary compute notes, the compute nodes sharing a same memory address space, each compute node further comprising a PLD coupled for data communications to at least one computer processor through a bus adapter, the bus adapter adapted for data communications through a set of one or more input/output ('I/O') memory addresses, each bus adapter defaulting, upon a stand-alone boot, to a same set of one or more I/O memory addresses, the apparatus comprising a computer processor, a computer memory operatively coupled to the computer processor, the computer memory having disposed within it computer program instructions capable of causing the apparatus to carry out the steps of:

configuring the primary compute node with an update of the configuration instructions for the PLDs;

assigning, by the PLDs at boot time in an SMP boot, a unique, separate set of one or more I/O addresses to each bus adapter on each compute node; and providing, by the primary compute node during the SMP boot, the update to all compute nodes, writing the update as a data transfer to each of the PLDs through each bus adapter at the unique, separate set of one or more I/O addresses for each bus adapter.

7. The apparatus of claim 6 wherein each PLD comprises only one of: a complex programmable logic device ('CPLD'), a field programmable gate array ('FPGA'), or a programmable system-on-chip ('PSOC').

8. The apparatus of claim 6 further comprising computer program instructions capable of causing the apparatus to carry out the steps of:

setting by each PLD an update-complete bit accessible by the primary compute node;

tracking by the primary compute node the number of update-complete bits that have been set; and determining by the primary compute node that the update process is complete when the number of set update-complete bits is equal to the number of compute nodes in the SMP computer.

9. The apparatus of claim 6 further comprising computer program instructions capable of causing the apparatus to carry out the steps of powering off, including removing standby power from the PLDs, and powering on in unison all the of the compute nodes in the SMP computer, booting the compute nodes in SMP mode, thereby reconfiguring the PLDs according to the updated configuration instructions.

10. The apparatus of claim 6 further comprising computer program instructions capable of causing the apparatus to carry out the steps of:

determining by the primary compute node that all compute nodes have successfully received the update of the configuration instructions;

sending by the primary compute node to all of the compute nodes an instruction to power off for a predetermined period of time;

responsive to the instruction to power off, powering off by all the compute nodes for the predetermined period of time, including removing standby power from the PLDs for the predetermined period of time; and powering on by all the compute nodes after the predetermined period of time, booting the compute nodes in SMP mode, thereby reconfiguring the PLDs according to the updated configuration instructions.

11. A computer program product for updating programmable logic devices ('PLDs') in a symmetric multiprocessing ('SMP') computer, each PLD configured according to configuration instructions installed within each PLD, the SMP computer comprising a plurality of compute nodes including a primary compute node and one or more secondary compute notes, the compute nodes sharing a same memory address space, each compute node further comprising a PLD coupled for data communications to at least one computer processor through a bus adapter, the bus adapter adapted for data communications through a set of one or more input/output ('I/O') memory addresses, each bus adapter defaulting, upon a stand-alone boot, to a same set of one or more I/O memory addresses, the computer program product disposed in a recordable, computer-readable storage device, the computer program product comprising computer program instructions which when executed on the SMP computer case the SMP computer to carry out the steps of:

configuring the primary compute node with an update of the configuration instructions for the PLDs;

assigning, by the PLDs at boot time in an SMP boot, a unique, separate set of one or more I/O addresses to each bus adapter on each compute node; and providing, by the primary compute node during the SMP boot, the update to all compute nodes, writing the update as a data transfer to each of the PLDs through each bus adapter at the unique, separate set of one or more I/O addresses for each bus adapter.

12. The computer program product of claim 11 wherein each PLD comprises only one of: a complex programmable logic device ('CPLD'), a field programmable gate array ('FPGA'), or a programmable system-on-chip ('PSOC').

13. The computer program product of claim 11 further comprising computer program instructions which when executed on the SMP computer case the SMP computer to carry out the steps of:

setting by each PLD an update-complete bit accessible by the primary compute node;

tracking by the primary compute node the number of update-complete bits that have been set; and determining by the primary compute node that the update process is complete when the number of set update-complete bits is equal to the number of compute nodes in the SMP computer.

14. The computer program product of claim 11 further comprising computer program instructions which when executed on the SMP computer case the SMP computer to carry out the steps of:

powering off, including removing standby power from the PLDs, and powering on in unison all the of the compute nodes in the SMP computer, booting the compute nodes in SMP mode, thereby reconfiguring the PLDs according to the updated configuration instructions.

15. The computer program product of claim 11 further comprising computer program instructions which when executed on the SMP computer case the SMP computer to carry out the steps of:

determining by the primary compute node that all compute nodes have successfully received the update of the configuration instructions;

sending by the primary compute node to all of the compute nodes an instruction to power off for a predetermined period of time;

responsive to the instruction to power off, powering off by all the compute nodes for the predetermined period of time, including removing standby power from the PLDs for the predetermined period of time; and powering on by all the compute nodes after the predetermined period of time, booting the compute nodes in SMP mode, thereby reconfiguring the PLDs according to the updated configuration instructions.

* * * * *